United States Patent [19]

Gautheret

[11] Patent Number: 4,583,867
[45] Date of Patent: Apr. 22, 1986

[54] SELF-ENERGIZED COMMUTATION DEVICE SENSITIVE TO A TEMPERATURE GRADIENT

[76] Inventor: Georges Gautheret, 16, Avenue Dubonnet, 92400 Courbevoie, France

[21] Appl. No.: 602,601

[22] Filed: Apr. 20, 1984

[30] Foreign Application Priority Data

Apr. 21, 1983 [FR] France .................. 83 06569

[51] Int. Cl.⁴ .............. G01K 7/02; G01K 13/00; H01H 47/00
[52] U.S. Cl. ................... 374/113; 60/329; 307/117; 374/144
[58] Field of Search .......... 374/112, 113, 179, 181, 374/182, 144, 110; 361/162, 208; 340/588

[56] References Cited

U.S. PATENT DOCUMENTS

| | | | |
|---|---|---|---|
| 2,117,027 | 5/1938 | Langbein | 374/113 |
| 2,304,489 | 12/1942 | Wetzel | 307/118 X |
| 2,463,566 | 3/1949 | Saldin | 374/144 |
| 3,043,932 | 7/1962 | Morris | 361/208 X |
| 3,101,617 | 8/1963 | Brinson | 374/113 |
| 3,138,957 | 6/1964 | Brunson | 374/112 X |
| 3,218,859 | 11/1965 | McBride et al. | 374/112 X |
| 3,767,470 | 10/1973 | Hines | 374/113 X |
| 3,789,665 | 2/1974 | Hohenberg | 374/144 |
| 3,990,308 | 11/1976 | McCormick et al. | 374/114 |
| 4,039,778 | 8/1977 | Williams | 374/181 X |
| 4,130,019 | 12/1978 | Nitschke | 374/181 X |
| 4,159,625 | 7/1979 | Kerr | 60/204 |
| 4,186,605 | 2/1980 | Bourigault | 374/144 X |
| 4,315,243 | 2/1982 | Calvert, Sr. | 374/113 X |

Primary Examiner—Daniel M. Yasich
Attorney, Agent, or Firm—Andrus, Sceales, Starke & Sawall

[57] ABSTRACT

A device, for assuring selective commutation of one or the other of two electric measuring circuits to a single electric exploitation circuit as a function of the temperature gradient present between two distinct points of reference, has a first thermocouple placed at the first point of reference; a second thermocouple placed at a second point of reference, connected in opposition to the first thermocouple in order to deliver a differential electro-motive force ($\Delta e$) of which the value and the sign are a function of the value and sense of the gradient; and commutation means sensitive to this electro-motive force and fed solely by the energy produced by the two thermocouples. The commutation means includes a relay fed by the differential electro-motive force.

10 Claims, 4 Drawing Figures

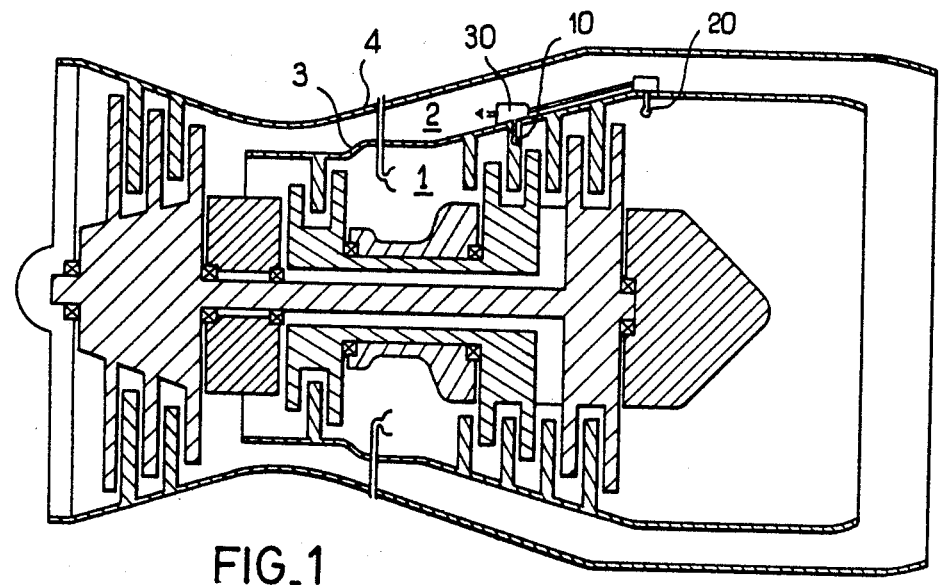
FIG_1
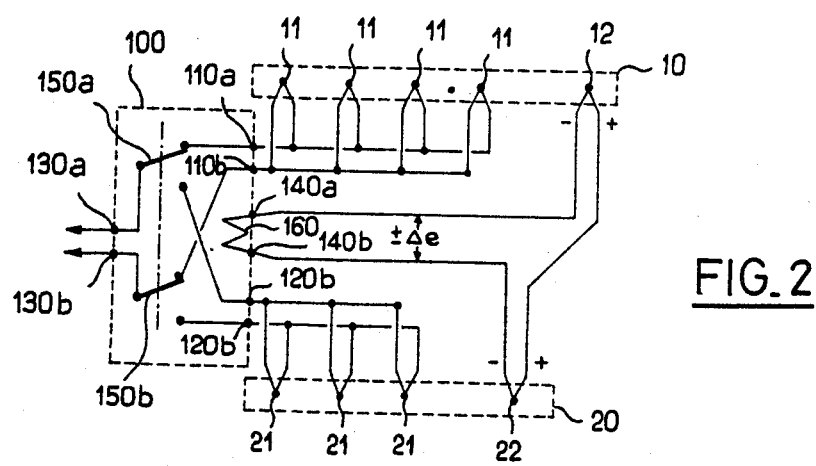
FIG_2
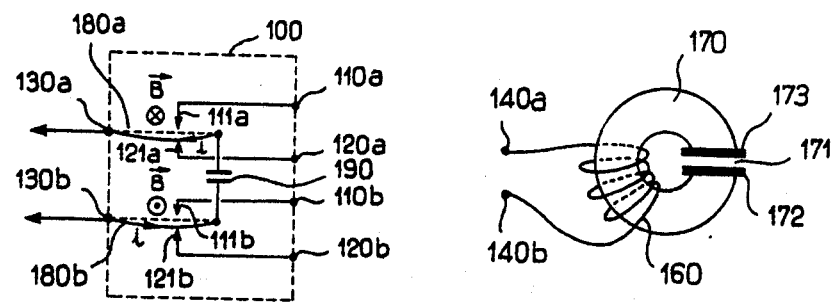
FIG_3   FIG_4

SELF-ENERGIZED COMMUTATION DEVICE SENSITIVE TO A TEMPERATURE GRADIENT

BACKGROUND OF THE INVENTION

The present invention concerns a self-fed commutation device sensitive to a temperature gradient.

This device is particularly suitable to the commutation of measuring transducers to thermocouples utilised for measuring the temperatures of combustion of aircraft turbojet engines.

In these engines, it is advisable to measure the temperature of combustion of gas with the greatest precision, to keep the engine at its optimum output.

Because the exhaust of burnt gases occurs in a section formed as a ring, a series or "harness" of temperature transducers, usually thermocouples, is generally used, with two to twelve in number distributed circularly in the ring and connected in parallel in such manner that the common voltage at the point of connection of all the thermocouples represents substantially a measurement of the mean of the temperatures in the gas exhaust ring. French Pat. No. 2,382,000 describes such a harness, for which it proposes a method of compensation of different thermocouples in a manner to give to each thermocouple branch the same impedance. The compensation thus always remains balanced whatever the variations of the temperatures.

It should be noted from the above that the exhaust temperature of the gases is measured, and not the temperature of combustion, which is the parameter to be monitored. This results because it is not possible to place measuring probes in the very middle of the combustion chamber of the engine (referenced 1 on FIG. 1 which represents a schematic sectional view of an engine). They can be placed only in the proximity of this chamber, for example, in a housing made in a fixed blade downstream of the combustion chamber. Reference 10 designates one of the probes of the harness installed in this way.

Generally, measurement of the exhaust temperature of the burnt gases is a good representation of the temperature of combustion.

This is not however true in certain particular configurations of flight, particularly during reverse flows: in this case, the bored fixed blades duct, at several levels, fresh air into the passage 2 situated between the inner and outer casings 3, 4 of the engine for re-injecting it into the path of the burnt gases. The reversal of direction of circulation of the ducted gases involves a sharp fall at the position of the harness of thermocouples 10 (a fall of several tens of degrees for an exhaust gas temperature of the order of 950° C.), whilst the temperature of combustion remains substantially the same.

Pilots are warned of this phenomenon and know that, during reverse flows, it is not advisable to take account of sharp falls which appear on the temperature indicators of the instrument panel.

In addition, it is known that there exists—for this configuration of flight but for it only—another position for the thermocouples at which the temperature of the exhaust gases is a good representation of the temperature of combustion.

However, the installation of temperature measuring circuits in existing engines does not permit leading out of more than two conductors. It is just not possible, if one wishes to adapt existing engines to double measurement, to arrange two thermocouple harnesses (which will be placed for example at 10 and 20 in FIG. 1) with two outputs connected to two distinct indicators giving the temperature at one or the other position in the engine, or through a commutation device functioning from a signal of the configuration of flight given as a function of the controls set by the pilot.

SUMMARY OF THE INVENTION

One of the objects of the invention is to alleviate these difficulties, by proposing a device for assuring a selective commutation of one or other of two electric measuring circuits to a single exploitation electric circuit which can be particularly applicable to the measurement of temperatures of a jet engine.

Another object of the invention is to propose such a device which by reason of limitation of the number of output conductors and the space available for their installation, can be placed in situ, in the engine, and can function despite an elevated ambient temperature (of the order of 300°-350° C. which exclude use of electronic components) and above all which is self-contained and assures passive commutation (that is to say which needs energy only from itself), because of the impossibility of providing an additional feedline of electric energy in the engine.

For this purpose, the invention commutates as a function of the temperature gradient present between two distinct points of reference, by a device having:

a first thermocouple placed at a first point of reference, a second thermocouple placed at a second point of reference, connected in opposition to said first thermocouple in a manner to deliver an electro-motive force differential ($\Delta e$) of which the value and the sign are a function of the value and sense of said gradient, commutation means sensitive to said electro-motive force and driven solely by energy produced by said two thermocouples, adapted to selectively connect one or the other said measuring circuit to said exploitation circuit according to the direction of change of said differential electro-motive force with respect to the electro-motive force corresponding to a null gradient, when the absolute value of this change exceeds a predetermined threshold.

The differential electro-motive force (produced by the Peltier effect on the thermocouples) resulting from the temperature gradient is used for self-feeding and controlling the commutation means, the direction of change of the differential electro-motive force with respect to the electro-motive force corresponding to a null gradient representing the sense of the gradient and indicating the choice of measuring circuit to commutate (this direction of change is equivalent to the sign of the electro-motive force when the two thermocouples are of the same nature).

In the particular case of the engine described above, each of the measuring circuits is connected to a harness of thermocouples placed respectively in the region of the first or the second point of reference. The commutation occurs when—and in a purely passive manner—the harness experiences the higher temperature, that is to say on that of which the measurement gives the better representation of the temperature of combustion, and this occurs whatever the configuration of flight.

The adaption to an existing engine is made without difficulty; it suffices to arrange a supplementary harness and to provide the commutation device for example inside one of the existing connection boxes (referenced 30 in FIG. 1), where the thermocouples are connected together in parallel and to the two conductors of the measuring circuit.

More precisely, the commutation means comprise a polarised relay of which the terminals of the winding are fed by the differential electro-motive force, the magnetic field produced by this winding acting on a movable contact-carrying blade assuring the selective commutation of the different circuits, which lead to the fixed contacts of the relay.

If necessary, the contacts are overlapping contacts, for avoiding an interruption in the continuity of measurement at the moment of commutation.

In a variant and advantageously, the commutation means comprise:

at least one pair of distinct fixed contacts placed opposite each other and respectively connected to one and the other of said measuring circuits, at least one wire movable between said two fixed contacts and of which an end is connected to said exploitation circuit, said wire coming in contact with one or the other of said fixed contacts in order to allow a measuring current to flow between one of said two measuring circuits and said exploitation circuit, and the direction of said current being substantially perpendicular to the direction of displacement of said wire, a magnetic field generating element fed by said differential electro-motive force, this magnetic field (B), being oriented perpendicular to the direction of said current and the direction of displacement of said wire, acting on said movable wire carrying said measuring current in order to make it come selectively in contact with one or the other of said fixed contacts as a function of the sign of said electro-motive differential force, and means for maintaining a current in said wire when it leaves at least one of said fixed contacts.

Other characteristics and advantages of the invention will appear from reading the detailed description below, making reference to the accompanying drawings, in which:

DESCRIPTION OF THE DRAWINGS

FIG. 1 already mentioned shows a diagrammatic crosssection of an engine showing the installation of the device, FIG. 2 is an electric circuit diagram of the device of the invention, with various thermocouples to which it is connected, FIG. 3 is a variant of the device of FIG. 1, utilising a movable wire in a magnetic field, FIG. 4 shows an example of a magnetic field generating element usable with the device of FIG. 3.

DETAILED DESCRIPTION

In FIG. 2, the commutation device 100 comprises two terminals 110a and 110b connected to a first measuring circuit, two terminals 120a, 120b connected to a second measuring circuit, two terminals 130a, 130b connected to an exploitation or utilization circuit (not shown) and two terminals 140a, 140b for energizing and controlling the device. The first measuring circuit comprises for example a series of thermocouples 11 connected in parallel, and the second measuring circuit a series of thermocouples 21 connected in parallel.

The thermocouples 11 are associated with a supplementary, distinct, thermocouple 12. Thermocouples 11 and 12 form a first harness 10 placed circularly in a first temperature measuring zone of the engine (FIG. 1).

Moreover, the thermocouples 21 are associated with a supplementary, distinct, thermocouple 22. Thermocouples 21 and 22 form a second harness 20 placed circularly in a second temperature measuring zone of the engine.

Commutation device 100 may be located in a connection box 30 for first harness 10 shown in FIG. 1.

If it is supposed that the temperatures are the same at all the points of each measuring zone (this corresponds to an ideal case and is true to a first approximation), one sees that the thermocouple 12 will have been carried substantially to the temperature of the first zone, and the thermocouple 22 to the temperature of the second zone.

The two thermocouples 12 and 22 are connected in opposition, in order that, each time that a temperature gradient exists between the two measuring zones, an electro-motive force $\pm \Delta e$ appears (if the two thermocouples are of the same nature, a null electro-motive force corresponds to a null gradient). This differential electro-motive force is applied to the terminals 140a, 140b of the commutation device 100. In FIG. 2, the commutation device is a polarised relay having contact-carrying movable blades 150a, 150b actuated in one direction or the other by a winding 160 driven by the electro-motive force $\pm \Delta e$.

In this manner, one will be able to arrange that the one of the two harnesses which is commutated to the exploitation circuit is always the one carried to the higher temperature (it has been shown that the higher one always corresponds to a harness providing a measurement representative of the combustion temperature).

For diminishing the minimum temperature gradient to provoke commutation, the two thermocouples 12 and 22 can be chosen to be different, for example a Cu-Ni/Ni-Cr thermocouple for the one and a Ni-Cr/Ni-Al thermocouple for the other: such a choice of alloys, for the indicated working temperatures of functioning, permits providing an electro-motive force in the region of 20 mV for a temperature of 600° C. With the two thermocouples not having the same temperature characteristic, the gradient for commutation can be lowered to the region of 25° C., for a real gradient, during reverse flows, of the order of 50° C.

In addition, the diameter of the thermocouple wires can be chosen so that the thermal inertia of the thermocouples 11 and 21 constituting the measuring probes is greater than the thermal inertia of the thermocouples 12 and 22 controlling the commutation means. This arrangement permits detecting the change of sense of gradient and provoking of the commutation before the measuring probes indicate a sharp change of temperature.

FIGS. 3 and 4 show a variant of the commutation device 100, in which, for each of the measuring circuits, the terminals 110a, 120a or 110b, 120b lead to the fixed, respectively oppositely placed contacts 111a, 121a or 111b, 121b.

The terminals 130a, 130b of the exploitation circuit are connected each to a wire 180a, 180b movable between the above-mentioned fixed contacts. Each of these wires comes in contact with one or other of the fixed contacts in order to allow passage of a measuring current between one of the measuring circuits and the exploitation circuit (this current is the current from either the thermocouples 11, or the thermocouples 21 into the exploitation circuit). The direction of current carried in the movable wires is substantially perpendicular to the direction of displacement of the wire.

Also provided is a magnetic field generating element, represented separately in FIG. 4, having a winding 160 fed by the differential electro-motive force produced by the thermocouples 12 and 22 connected to the terminals 140a and 140b, in a manner corresponding to that shown in FIG. 2. This winding is for example made around a toric core 170 split in a manner to arrange a gap 171.

A magnetic field generating element such as that of FIG. 4 is provided for each of the movable wires of FIG. 3; each movable wire is disposed in the gap 171 where it experiences the magnetic field B of which the sense and intensity depends upon the differential electro-motive force.

Under the influence of this magnetic field, the movable wire will come in contact with one or the other of the fixed contacts, so assuring the selection of one of the measuring circuits.

Preferably, elongated polar pieces 172, 173, are provided, these polar pieces being elongated parallel to the direction of the movable wire situated in the gap which they determine.

In addition, a damping condensor 190 is provided connected to each end of the movable wire end not connected to the exploitation circuit, in a manner to maintain a current in the wire during the passage from one position to the other. This condensor will be able to ensure continuity of the reading during commutation (continuity which, in the case of engines, is assured in fact by the mechanical inertia of the indicator, of which the impedance is fixed by strict standards).

Although the invention has been described in an application where it produces particularly advantageous results, it can be applied to a large number of other cases where one seeks commutation of two circuits (not necessarily thermocouple circuits, nor indeed with temperature probes) as a function of a gradient present between two points: the device of the invention permits, for example, in a simple automatic manner the finding of the maximum temperature between two points or between a larger number of points, if one puts several devices in cascade. Such a problem is frequently met in chemical engineering, where it is necessary, amongst many temperature indications to find that corresponding to the highest temperature.

The invention is equally applicable to the simple commutation of a single signal (the circuit "of exploitation" then being an input) towards one or the other of two circuits utilising this signal (the "measuring" circuits then constituting two outputs of the device) as a function of the sense of a temperature gradient and departing from a predetermined threshold value thereof.

While there have been shown and described preferred embodiments of a selective commutation device, in accordance with the invention, it will be appreciated that many changes and modifications may be made therein without departing from the essential spirit of the invention as defined by the claims.

I claim:

1. A device for obtaining selective commutation of two electric measuring circuits (11, 21) to a single utilization electric circuit as a function of the temperature gradient present between two distinct points of reference, said device comprising:
    a first thermocouple (12) placed at a first point of reference,
    a second thermocouple (22) placed at a second point of reference, said second thermocouple being connected in opposition to said first thermocouple in a manner to deliver an electro-motive force differential, (Δe) the value and sign of which are a function of the magnitude and sense of said temperature gradient,
    commutation means (100) responsive to said electromotive force differential and energized solely by energy produced by said two thermocouples, said commutation means being adapted to selectively connect one or the other said measuring circuit to said utilization circuit according to the sign of said differential electro-motive force with respect to the electro-motive force corresponding to a null gradient, when the absolute value of the electromotive force differential exceeds a pre-determined threshold.

2. A device according to claim 1, wherein said commutation means comprises a polarized relay of which the terminals of the winding are fed by said differential electro-motive force, the magnetic field produced by said winding activating a movable contact-carrying blade obtaining selective commutation of said electric measuring circuits, connected to input terminals of said relay.

3. A device according to claim 1, wherein said commutation means comprises:
    at least one pair of distinct fixed contacts placed opposite each other and respectively connected to one and the other of said measuring circuits,
    at least one wire movable between said two fixed contacts and of which an end is connected to said utilization circuit, said wire coming in contact with one or the other of said fixed contacts in order to allow a measuring current to flow between one of said two measuring circuits and said utilization circuit, and the direction of said current being substantially perpendicular to the direction of displacement of said wire,
    a magnetic field generating element fed by the differential electro-motive force, the magnetic field (B) of which, being oriented perpendicular to the direction of said current and the direction of displacement of said wire, acting on said movable wire carrying said measuring current in order to make it come selectively in contact with one or the other of said fixed contacts as a function of the sign of said electro-motive differential force, and
    means for maintaining a current in said wire when it leaves at least one of the said fixed contacts.

4. A device according to claim 3, wherein said magnetic field generating element comprises a winding around a toric core split radially in a manner to form an air gap, said movable wire being disposed in said air gap.

5. A device according to claim 4, wherein said core is provided with polar pieces in a form elongated parallel to the direction of said movable wire.

6. A device according to either one of claims 4 and 5, wherein said means for maintaining a current in said wire comprises a damping condenser connected to each end of said movable wire not connected to said utilization circuit, in order to maintain in said wire a current during its displacement from one said fixed contact to the other.

7. A device according to claim 1, wherein one of the thermocouples is a Cu-Ni/Ni-Cr thermocouple, the other couple being a NiCr/Ni-Al thermocouple.

8. A device according to claim 1, wherein each of said measuring circuits comprises at least one temperature measuring probe placed in the region of said first or second point of reference respectively.

9. A device according to claim 8, wherein said measuring probe is a thermocouple probe.

10. A device according to claim 9, wherein the thermal inertia of said thermocouples constituting said measuring probes is greater than the thermal inertia of said thermocouples controlling said commutation means.

* * * * *